US008585543B1

(12) United States Patent
Davis et al.

(10) Patent No.: US 8,585,543 B1
(45) Date of Patent: Nov. 19, 2013

(54) SPEED CONTROL FOR A MACHINE WITH A CONTINUOUSLY VARIABLE TRANSMISSION

(71) Applicant: Caterpillar Inc., Peoria, IL (US)

(72) Inventors: Kevin Davis, Washington, IL (US); Adam Nackers, East Peoria, IL (US); Steven Ott, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/666,250

(22) Filed: Nov. 1, 2012

(51) Int. Cl.
F16H 61/662 (2006.01)
(52) U.S. Cl.
USPC ............................................... 477/43
(58) Field of Classification Search
USPC .................................... 477/43, 115
See application file for complete search history.

(56) References Cited

U.S. PATENT DOCUMENTS

| 4,056,176 | A | | 11/1977 | Förster et al. |
| 5,047,937 | A | * | 9/1991 | Vahabzadeh et al. ............ 701/54 |
| 5,154,267 | A | | 10/1992 | Watts |
| 5,389,051 | A | | 2/1995 | Hirate et al. |
| 5,526,261 | A | | 6/1996 | Kallis et al. |
| 6,217,477 | B1 | | 4/2001 | Nobumoto et al. |
| 6,223,592 | B1 | | 5/2001 | Genise |
| 6,240,356 | B1 | | 5/2001 | Lapke |
| 6,347,680 | B1 | | 2/2002 | Mianzo et al. |
| 6,385,970 | B1 | | 5/2002 | Kuras et al. |
| 6,388,407 | B1 | | 5/2002 | Eguchi |
| 6,474,186 | B1 | | 11/2002 | Vollmar |
| 6,817,338 | B2 | | 11/2004 | Janic et al. |
| 7,192,374 | B2 | | 3/2007 | Kuras et al. |
| 7,296,496 | B2 | | 11/2007 | Shah |
| 7,400,964 | B2 | | 7/2008 | Shiiba et al. |
| 7,401,542 | B2 | | 7/2008 | Stephens et al. |
| 7,641,588 | B2 | | 1/2010 | Thomson et al. |
| 7,669,580 | B2 | | 3/2010 | Silbernagel et al. |
| 7,762,923 | B2 | | 7/2010 | Schuh et al. |
| 7,894,968 | B2 | | 2/2011 | Stroh et al. |
| 7,972,240 | B2 | | 7/2011 | Janasek |
| 8,070,651 | B2 | | 12/2011 | Eastman et al. |
| 8,216,109 | B2 | | 7/2012 | Dahl et al. |
| 2008/0172162 | A1 | | 7/2008 | Wegeng et al. |
| 2009/0088936 | A1 | | 4/2009 | Hubbard et al. |
| 2009/0112424 | A1 | | 4/2009 | Dahl et al. |
| 2010/0137102 | A1 | | 6/2010 | Sopko, Jr. et al. |
| 2011/0088961 | A1 | | 4/2011 | Case et al. |

(Continued)

FOREIGN PATENT DOCUMENTS

| EP | 1640640 A1 | 3/2006 |
| JP | 01-244930 A | 9/1989 |
| JP | 2010-078089 A | 4/2010 |

Primary Examiner — Edwin A Young
(74) Attorney, Agent, or Firm — Leydig, Voit & Mayer

(57) ABSTRACT

A system and method of controlling the speed of a machine having a continuously variable transmission (CVT) operatively coupled to a power source. A plurality of selectable virtual gear ratios can be associated with the CVT. The machine may include an operator input device that may generate a operator input signal indicative of a desired adjustment in the ground speed. The operator input signal may be converted to a CVT speed command and to a power source speed command that are communicated to the CVT and the power source, respectively. The CVT adjusts the machine speed in accordance with the CVT speed command, while the power source adjusts its speed in accordance with the power source speed command, so that operation of the power source is substantially independent of operator of the CVT.

20 Claims, 7 Drawing Sheets

(56) References Cited

U.S. PATENT DOCUMENTS

2011/0301793 A1  12/2011  Hsieh et al.
2012/0083976 A1  4/2012  Fleming et al.
2012/0136548 A1  5/2012  Hoff
2012/0157254 A1*  6/2012  Aitzetmueller et al. ........ 475/31

* cited by examiner

SPEED CONTROL FOR A MACHINE WITH A CONTINUOUSLY VARIABLE TRANSMISSION

TECHNICAL FIELD

The present disclosure relates generally to a machine equipped with a continuously variable transmission (CVT) and, more particularly, to a CVT adapted to operate in one or more discrete, virtual gear ratios.

BACKGROUND

Many machines use transmissions to couple the output of a prime mover or power source, for example, an internal combustion engine, to a driven element or device such as wheels or a work implement. Traditional transmissions typically included one or more fixed, selectably engageable gear ratios that could increase or decrease the speed of the prime mover and, usually in an inverse relationship, the torque. Specific gear ratios often correspond to discrete and known speed ranges of the driven device such that selection of a specific gear ratio will enable operation of the driven device within that speed range. Accordingly, changing the desired speed and/or torque may require changing gear ratios that can be done in a step-controlled manner, i.e., gearing up or gearing down. Many operators of these machines have become accustomed to using traditional transmissions because they provide reliability and repeatability in operating the machine and, particularly, the driven device. For example, an operator may know that higher gears are better suited for high-speed, low drag travel and lower gears are better suited for hauling operations or acceleration.

Recently, some manufacturers have equipped certain machines with continuously variable transmissions (CVTs) instead of the conventional, gear-based transmissions. A CVT provides an infinite or continuous range of torque-to-speed output ratios with respect to any given input from the prime mover. In other words, the output of the CVT can be increased or decreased across a continuous range in almost infinitesimally small increments. Thus, a CVT does not engage specific, discrete gear ratios to determine or control its output. However, some operators have expressed discomfort with CVTs because they lack the selectable and predicable gear ratios of conventional gear-based transmissions.

U.S. Pat. No. 7,641,588 ("the '588 patent"), assigned to the assignee of the present application, describes one approach to remedying or reducing operator discomfort and unfamiliarity with CVTs. According to the '588 patent, an electronic or computer-aided controller may be operatively associated with the CVT and/or the prime mover. The controller is configured to regulate or limit operation of those devices within distinct output ranges provided by a plurality of discrete, predetermined speed ranges that an operator may selectively engage. The '588 patent thus provides virtual gear ratios resembling the actual gear ratios employed in conventional transmissions. The present disclosure is directed to furthering implementation and coordination of the virtual gear methodology with CVTs and to improving user operability of machines equipped with such capabilities.

SUMMARY

In accordance with one aspect, the disclosure describes a method of controlling a ground speed of a machine including a CVT operatively coupled to a power source. The method includes selecting a virtual gear ratio from a plurality of virtual gear ratios and receiving an operator input signal indicative of a desired adjustment in the ground speed. The method converts the operator input signal to a CVT speed command and communicates the CVT speed command to the CVT. The CVT thereby adjusts the ground speed in accordance with the CVT speed command. The method also converts the operator input signal to a power source speed command and communicates the power source speed command to the power source. Operation of the power source may thereby be adjusted substantially independently of the CVT speed.

In another aspect, the disclosure describes a machine including a CVT operatively coupled to the power source. Associated with the CVT may be a plurality of selectable virtual gear ratios each having a minimum virtual gear speed and a maximum virtual gear speed. Likewise, the power source may have an adjustable range of power source speeds including a minimum power source speed and a maximum power source speed. The machine includes an operator input device. The operator input device is in communication with the CVT to adjust the virtual gear speed between the minimum virtual gear speed and the maximum virtual gear speed. The operator input device also communicates with the power source to adjust the power source speed between the minimum power source speed and the maximum power source speed. Adjustment of the power source occurs independently of the virtual gear ratio selected.

In yet another aspect, the disclosure describes a method of adjusting speed of a machine having a power source operatively coupled to a CVT. The method includes receiving an operator input signal indicative of a desired machine speed and converting the signal to a scaling factor. The scaling factor is compared to a range of power source speeds between a minimum and a maximum power source speed to determine a power source speed command. The power source speed command is communicated to the power source that then operates in accordance with the power source speed command. The method also involves selecting a virtual gear ratio from a plurality of virtual gear ratios associated with the CVT. Each virtual gear ratio including a range of virtual gear speeds between a minimum virtual gear speed and a maximum virtual gear speed. The scaling factor is also compared to the range of virtual gear speeds for the virtual gear ratio selected to determine a CVT speed command. The CVT speed command is communicated to the CVT that then operates in accordance with the CVT speed command.

DETAILED DESCRIPTION

Figure 1:
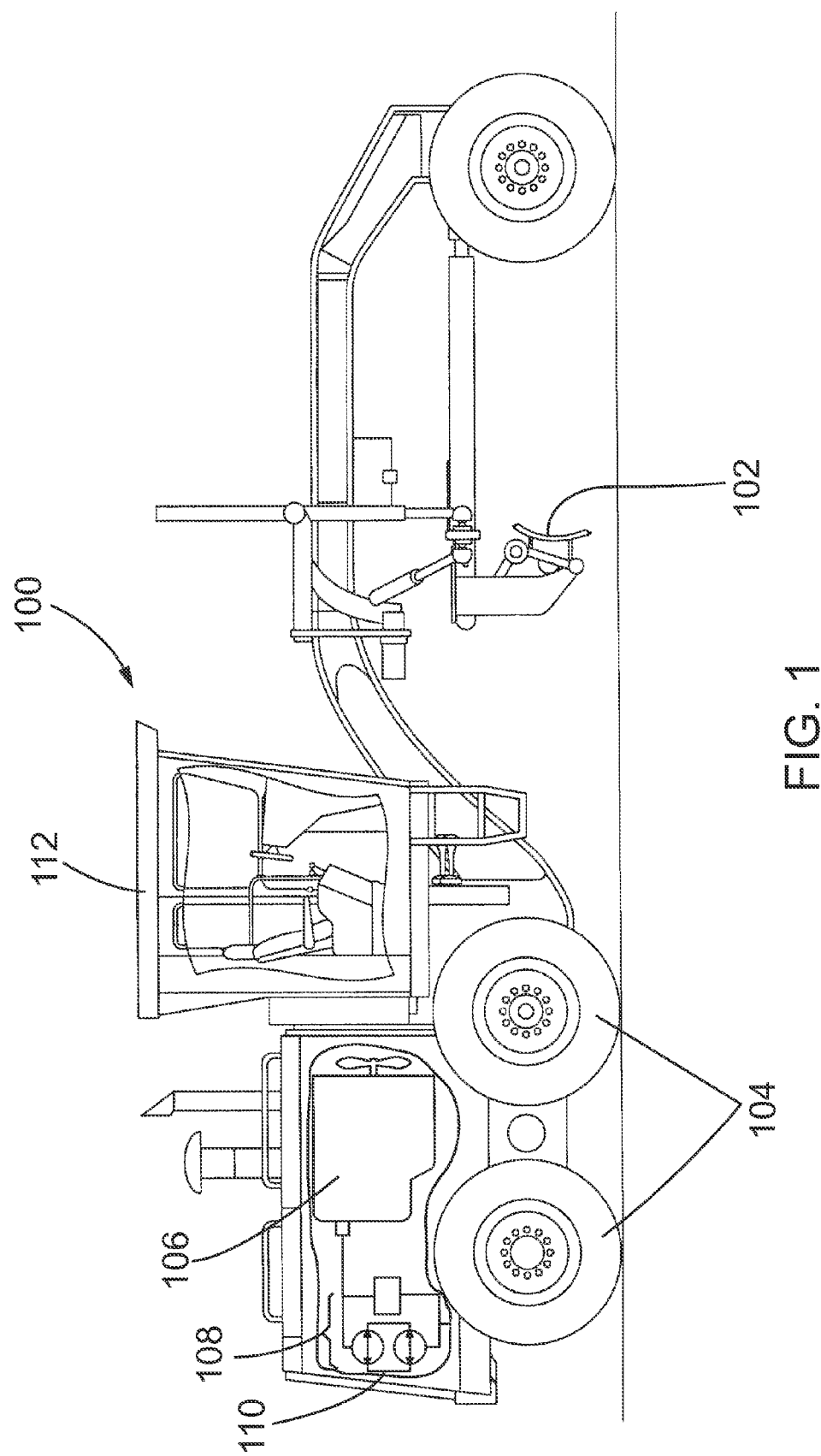
FIG. 1 is a diagrammatical, side elevational view of a mobile machine having a prime mover power source coupled to a driven element through an intermediate CVT.

This disclosure relates to a machine equipped with a continuously variable transmission (CVT) to operatively couple and transfer mechanical power from a prime mover power source to a driven element. CVTs may sometimes be referred to as infinitely variable transmissions (IVTs), however, the disclosure relates to both transmissions and any similar type of transmission regardless of nomenclature. Now referring to FIG. 1, wherein like reference numbers refer to like elements, there is illustrated an embodiment of a machine 100 and in particular a motor grader designed in accordance with the present disclosure. However, the present disclosure is applicable to other types of machines in addition to motor graders. As used herein, the term "machine" may refer to any type machine that performs some operation associated with an industry such as mining, construction, farming, transportation, or any other industry known in the art. Examples of such machines include but are not limited to wheel loaders, excavators, back hoes, compactors, pavers, etc. Moreover, an implement may be connected to the machine. Such implements can be utilized for a variety of tasks, including, for example, loading, compacting, lifting, brushing, and include, for example, buckets, compactors, fork lifting devices, brushes, grapples, cutters, shears, blades, breakers/hammers, augers, and others. For example, the machine may be an earth-moving machine, such as a wheel loader, excavator, dump truck, backhoe, motor grader, material handler or the like. Additionally, the machine can be used in the transportation field such as on-highway trucks, cargo vans, or the like.

The illustrated machine 100 may be capable of alternating between high-speed, over-the-road travel and heavy, load-engaging operation. For example, the machine 100 can include a ground-engaging implement such as a blade 102 that may be power adjusted for flattening or smoothing a worksite surface. The machine 100 is suspended on ground engaging propulsion devices 104 such as wheels that may be disposed toward the front and the rear of the machine. In other machine embodiments, alternative propulsion devices 104 may include continuous tracks, belts, propellers, etc. To propel and direct the machine with respect to the ground, at least one set of the propulsion device may be power-driven to rotate and/or another set may be steerable by an operator onboard, remotely, or by another control scheme.

Power for driving the wheels can be provided by a power source 106, sometimes referred to as a prime mover, that is disposed on the machine. A suitable example of a power source 106 is an internal combustion engine, such as a compression ignition diesel engine, that burns a hydrocarbon-based fuel or another combustible fuel source to convert the potential or chemical energy therein to mechanical power that may be utilized for other work. Other suitable types of power sources 106 can include spark-ignition gasoline engines, turbines, hybrid engines, solar powered engines, and the like. To transfer the mechanical power produced by the power source 106 to the propulsion devices 104, the machine 100 can include a powertrain 108 operatively coupling the power source and the propulsion devices through an intermediate CVT 110. The powertrain 108 may also include various shafts, clutches, differentials, and other devices to transmit power and to assist in operation of the machine. Additionally, one or more power takeoffs (PTOs) may engage directly or indirectly with the powertrain 108 to redirect or retransmit a portion of the power to an auxiliary device such as the power-actuated blade 102.

Figure 2:
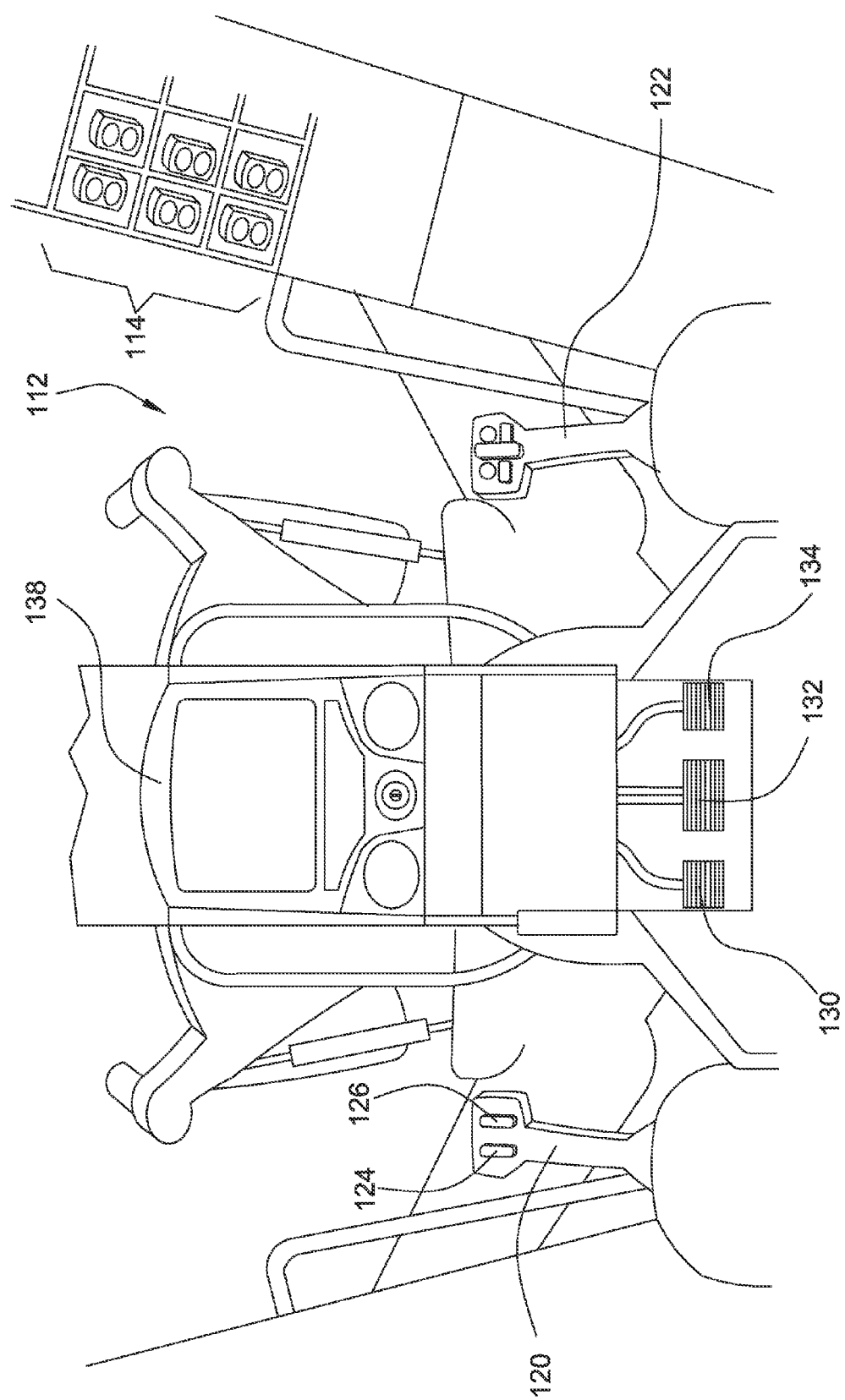
FIG. 2 is a fragmentary perspective view of an operator station of the machine including various accessible, operator-actuated controls and inputs for operating the machine.

To direct operation of the machine 100, an operator station 112 configured to accommodate an operator can be disposed on the machine or remotely in a location that allows visual command over the operating environment. Various controls and/or inputs 114 with which the operator may interact to maneuver and operate the machine 100 may be accessible inside the operator station 112. The controls and/or inputs illustrated in FIG. 2 are provide by way of example only and may include different arrangements in different embodiments. For example, referring to FIG. 2, the controls and/or inputs 114 may include a first control column or joystick 120 and a second joystick 122 disposed toward either side of the operator station 112 that the operator may grasp and manipulate to steer the machine 100 in a particular direction. In other embodiments, a steering wheel can be provided. A forward-neutral-reverse (F-N-R) selector 124 in the form of a toggle or switch for selecting a forward-neutral-reverse direction of the machine may be disposed in an appropriate accessible location, such as on the first joystick 120. A virtual gear shifter 126 in the form of a roller or slide switch, can for example also be provided, for example, on the first joystick 120 or at another suitable location, to alter the perceived operation of the CVT by selection of different virtual gear ratios. Various other types of switches, buttons, knobs, dials, levers and the like may be included on the joysticks 120, 122 or at other accessible locations in the operator station 112.

Further adjustment of the machine's operation may be implemented through one or more pedals located toward the floor of the operator station 112. An operator can depress or release a pedal through a range of displacement to bring about an expected response from the machine. Specifically, as in the illustrated embodiment, one or more of a right-oriented first pedal 130, center-oriented second pedal 132 and left-oriented third pedal 134 can be provided. For example, the first pedal 130 may function as a throttle pedal. By modulating the first pedal 130, the operator may indicate a desire to accelerate or decelerate the machine so as to increase or decrease the speed or velocity of the machine. The operator may also indicate a desire to maintain a consistent speed or power output of the machine by holding the pedal at a fixed modulation with respect to a ground. The second pedal 132 can be associated with a service brake that may retard rotation of the powertrain 108. The left-oriented third pedal 134 may be associated with a slip clutch that can engage and disengage various components in the powertrain 108. In other embodiments, different numbers of pedals or alternative types of operator input devices may be included.

To visually interact with the operator, a visual display 138 including a screen or monitor may be provided in the operator station 112. The visual display 138 may display, for example, information regarding operating parameters, performance characteristics, conditions, and variables regarding various aspects of the machine's operation. Common display information may include speed, direction, power source revolutions-per-minute (RPM), engine load, fuel level, and the like. The visual display 138 can be any suitable type of display including a liquid crystal display (LCD), a cathode ray tube (CRT), a plasma display or the like. Additionally, the visual display 138 may be configured to receive input from the operator through touch-screen technology, soft buttons and so forth.

Figure 3:
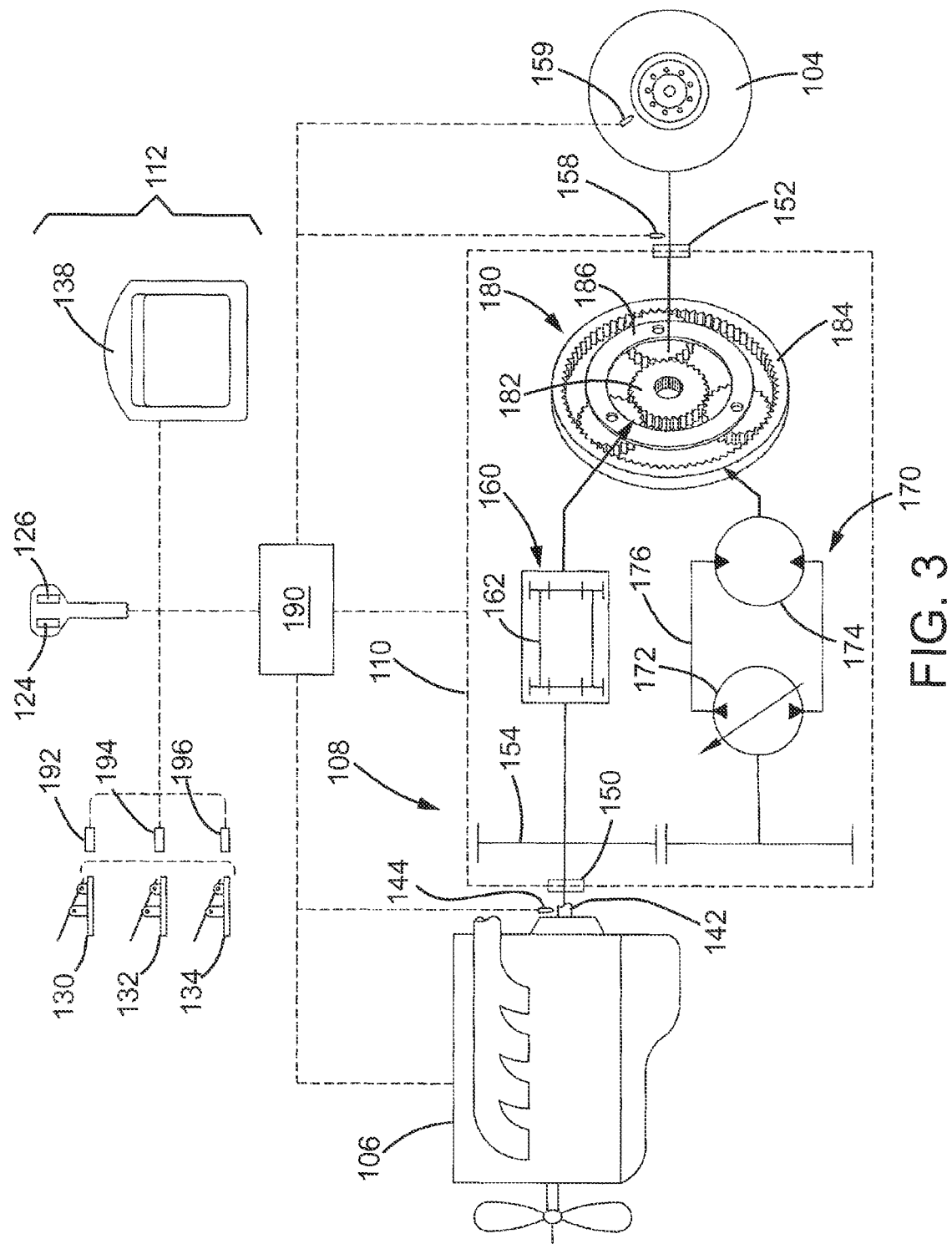
FIG. 3 is a schematic illustration of a powertrain of the machine including an embodiment of a CVT and a controller adapted to operate the CVT using a plurality of virtual gear ratios.

Referring to FIG. 3, an embodiment of the powertrain 108 for transferring mechanical power through the machine is illustrated in more detail. The prime mover power source 106, for example, a diesel-burning internal combustion engine, produces a rotational power output that can rotate a power source output 142, such as a drive shaft, extending from the power source. The speed and, in a somewhat related manner, the torque produced by the power source may be selectively varied. For example, considering a given engine design and volumetric displacement of the combustion chambers in a diesel-burning internal combustion engine, the speed and power output can be adjusted by increasing or decreasing the quantity of fuel introduced and combusted. Those adjustable parameters may be constrained by the physical limitations of the engine. For example, the engine may have a maximum "red-line" speed above which it overheats and seizes and a minimum speed below which it stalls due to internal friction between its moving parts. For a diesel-burning internal combustion engine, for example, the maximum or "high idle" speed may be about 1850 RPM and a minimum or "low idle" speed of about 800 RPM. In other embodiments, different speed ranges may be used, particularly with different types of power sources that may be employed.

To measure, directly or indirectly, the rotational output speed produced by the power source 106, i.e., the power source speed, a power source sensor 144 can be associated with the power source output 142. By way of example, the power source sensor 144 may be a magnetic pickup type sensor that may sense a rotating magnetic field generated by a magnet associated with a rotating component of the power source output 142 such as the drive shaft, flywheel or the like. In other embodiments, the power source sensor 144 may be an optical pickup sensor that optically reads a visual indication on the rotating component. Other systems that may be associated with the power source 106 include fuel systems, air intake systems, exhaust systems, and the like.

To adjust the speed and/or torque of the rotational output produced by the power source 106, for example, by increasing speed and inversely affecting torque, the CVT 110 can be disposed down line of and operatively coupled to the power source output 142. As stated above, the CVT 110 may provide a continuous or infinite number of available torque-to-speed ratios for varying the output from the power source 106. In other words, the CVT 110, which is represented as a dashed-line box, can receive the rotational output though a CVT input member 150 associated with the power source output 142, and modify it in a controlled manner by changing the torque-to-speed ratio across a continuous range or spectrum before transmitting it through a CVT output member 152. To vary the torque-to-speed ratio, one or more operational characteristics of the CVT may be responsively controlled.

In the illustrated embodiment, the CVT 110 may be a split-path, hydromechanical CVT in which the rotational input from the CVT input member 150 is proportionally split into two parallel paths before being recombined at the CVT output member 152. The paths may include a mechanical power-transfer path 160 and a hydrostatic power-transfer path 170 disposed inside the CVT 110. To physically split the rotational input, a path splitter 154 coupled to a shaft of the CVT input member 150 may include a series of parallel, intermeshing gears that may duplicate and offset the rotational axis of the rotary input to align with either or both of the mechanical power-transfer path 160 and the hydrostatic power-transfer path 170.

The mechanical power-transfer path 160 may transfer the rotational power input from the CVT input member 150 to the CVT output member 152 by mechanical, dynamic techniques. For example, the mechanical power-transfer path 160 may embody a multispeed, bidirectional, mechanical transmission with various forward gears, reverse gears and/or clutches. The gears and/or clutches may be arranged in an adjustable and selectively engageable gear train 162 so that predetermined gear combinations may be engaged to produce a discrete output gear ratio. In this manner, the mechanical power-transfer path may function similarly to the traditional gear-based transmissions.

The hydrostatic power-transfer path 170 may transfer the rotational power output from the CVT input member 150 to the CVT output member 152 using fluid mechanics and hydraulics concepts. For example, the hydrostatic power-transfer path 170 may include a hydraulic pump 172 and a hydraulic motor 174 interconnected by a fluid transfer line 176 such as a flexible hydraulic hose that may channel hydraulic fluid. The hydraulic pump 172, which may be a variable displacement pump, swash plate, or the like, may be operatively coupled to the CVT input member 150 and can convert the rotary power input to hydraulic pressure by pressurizing the hydraulic fluid in the fluid transfer line 176. The fluid transfer line directs the pressurized hydraulic fluid to the hydraulic motor 174 to rotate an associated impeller or the like and reconvert the hydraulic pressure to a rotational output. A "gear ratio" or "effective gear ratio" of the hydrostatic power-transfer path 170 may be altered by, for example, varying the displacement of the hydraulic pump 172 or changing the resistance of the fluid transfer line 176. Hydraulic displacement and/or resistance may be varied continuously within the operational limits of the CVT to provide an infinite number of effective gear ratios.

The outputs of the mechanical power-transfer path 160 and a hydrostatic power-transfer path 170 may be recombined using one or more gear assemblies operating in conjunction with the CVT output member 152. For example, the gear assemblies may include a planetary gear 180 including an inner sun gear 182, an outer ring gear 184, and an intermediary carrier 186 operatively engaged with each other. As will be appreciated by those of skill in the art, the interrelationship and the relative rotation of the various gears in a planetary gear can be adjusted to produce a variety of different outputs including reversible outputs. For example, the speed at which ring gear 184 rotates relative to a ground, and the speed at which carrier 186 rotates relative to ring gear 184, may determine a rotational speed of sun gear 182. Accordingly, any combined gear ratio may be achieved by varying the discrete gear ratio of the mechanical power-transfer path 160, the variable gear ratio of the hydrostatic power-transfer path 170, and recombining them at different selected relations in the planetary gear 180, thus changing the output torque and speed characteristics of the CVT 110.

In other embodiments, the CVT can be a purely mechanical CVT using a series of selectable, interrelated gear trains such as the gear train 162 in FIG. 3. The purely mechanical CVT can also be realized as a variable diameter friction pulley system including two or more, parallel, inverted cone-like pulleys interconnected by a belt. An actuator can axially displace the belt with respect to the parallel pulleys to align at different diameters thereby producing variable torque and speed outputs. In other embodiments, the CVT can be a purely hydrostatic CVT similar to the hydrostatic power-transfer path 170 in FIG. 3. Furthermore, the CVT can be an electrical-magnetic CVT including a generator-motor combination. The rotational input can drive the generator to produce electricity that drives the motor to reproduce the rotational output. To continuously vary the torque-to-speed ratio, the electrical resistance between the generator and motor can be adjusted in increasingly small increments. In other embodiments, any other suitable type of CVT can be used.

To measure the rotational output of the CVT 110, a CVT sensor 158, such as a magnet pickup sensor or an optical sensor, can be associated with the CVT output member 152 to sense the rotational speed produced. In another embodiment, the torque output of the CVT 110 may be determined by a sensor disposed in the fluid transfer line 176 that measures hydraulic pressure therein. The torque transfer through the CVT may then be estimated from the measured hydraulic pressure and any possible transmission losses or inefficiencies may be accounted for. The powertrain 108 can terminate at a propulsion device 104, such as a rotatable wheel that engages the ground and propels the machine. Various axles, differentials and the like may facilitate the engagement of the powertrain 108 to the wheel. To measure an actual machine speed, a ground speed sensor or the like (not illustrated) may be provided. In the embodiment of FIG. 3, a machine speed sensor 159, such as a magnetic pickup or optical sensor, may be associated with the wheel. Machine speed, i.e., distance traveled per time, may be calculated by multiplying the revolutions per second of the wheel by the circumference of the wheel. In various embodiments, the machine speed sensor or another sensor may determine if the propulsion device is slipping or spinning out with respect to the ground.

To coordinate and control the various components in the powertrain 108 including the CVT 110, the machine may include an electronic or computerized control unit, module or controller 190. The controller 190 may be adapted to monitor various operating parameters and to responsively regulate various variables and functions affecting the powertrain. The controller 190 may include a microprocessor, an application specific integrated circuit (ASIC), or other appropriate circuitry and may have memory or other data storage capabilities. The controller may include functions, steps, routines, control maps, data tables, charts and the like saved in and executable from read-only memory or another electronically accessible storage medium to control the engine system. Storage or computer readable mediums may take the form of any media that provides instructions to the controller for execution. The mediums may take the form of non-volatile media, volatile media, and transmission media. Non-volatile media includes, for example, optical or magnetic disks. Volatile media includes dynamic memory. Transmission media includes coaxial cables, copper wire and fiber optics, and may also take the form of acoustic or light waves, such as those generated during radio-wave and infra-red data communications. Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave or any other medium from which a computer or processor may read. Although in FIG. 3, the controller 190 is illustrated as a single, discrete unit, in other embodiments, the controller and its functions may be distributed among a plurality of distinct and separate components. To receive operating parameters and send control commands or instructions, the controller may be operatively associated with and may communicate with various sensors and controls in the operators station 112 and the powertrain 108. Communication between the controller and the sensors may be established by sending and receiving digital or analog signals across electronic communication lines or communication busses. The various communication and command channels are indicated in dashed lines for illustration purposes.

For example, to register a desired increase or decrease in the speed or power output of the machine with respect to the ground, the controller 190 may communicate with a first pedal sensor 192 associated with and registering articulation of the first pedal 130 intended as a throttle register. The first pedal sensor 192 can generate an operator input signal upon modulation of the first pedal and communicate that operator input signal to the controller 190 that may accordingly adjust operation of one or more components in the powertrain 108 to increase or decrease machine speed and/or output. To register modulation of the second pedal 132 and third pedal 134, the controller may also be in communication with a second pedal sensor 194 and a third pedal sensor 196 operatively associated with those inputs. To receive and communicate other instructions or commands with the operator, the controller 190 may be associated with the other controls and the visual display 138 in the operator station 112. To monitor the output speed and/or torque produced by the power source 106, the controller 190 may communicate with the power source sensor 144. For the described internal combustion engine producing a rotational force, the monitored speed may be in revolutions per minute (RPM). Likewise, to monitor the changes to the torque-to-speed output affected by the CVT 110, the controller may communicate with the CVT sensor 158. The controller 190 may also determine or estimate the actual machine speed, regardless of transmission concerns in the powertrain 108, by directly communicating with the machine speed sensor 159 associated with the propulsion device 104.

Figure 4:
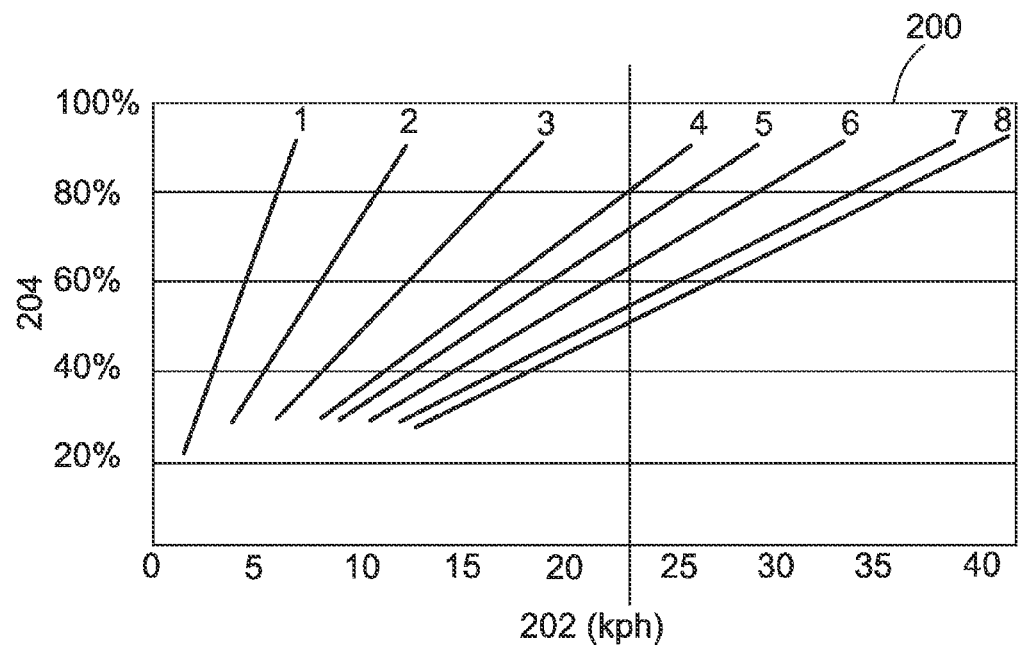
FIG. 4 is an illustration of a control map or chart correlating machine speed ranges to a plurality of virtual gear ratios and to registered pedal modulation.

Although the machine 100 is capable of operating continuously across its full range of machine speeds by adjusting the power source output and/or CVT output, the controller 190 may regulate the output speed and/or torque of the CVT 110 within discrete ranges by associating those ranges with a plurality of virtual gear ratios. Any suitable number of virtual gear ratios may be utilized including fractions or increments of discrete virtual gear ratios. The virtual gear ratios may be associated with the forward and/or reverse directions of the machine. For example, referring to FIG. 4, the controller may be programmed with a virtual gear map 200 that reflects the relation between machine performance and the plurality of virtual gear ratios that, in the illustrated example, may include gears (1) through (8). Each virtual gear ratio may have an associated range of virtual gear speeds between a minimum virtual gear speed and a maximum virtual gear speed and the virtual gear map 200 charts the available virtual gear speeds that can correspond directly to the machine speed for each virtual gear ratio along the X-axis 202. For example, in the illustrated embodiment, virtual gear ratio (1) may correspond to an intended machine speed of between 0 and 5 kilometers per hour (kph) while virtual gear ratio (2) may correspond to an intended machine speed of between 4 and 12 kilometers per hour. Virtual gear ratio (8) may correspond to an intended maximum speed of the machine, e.g., 40 kph. Thus, the plurality of virtual gear ratios (1)-(8) provides a series of increasing higher and overlapping available speed ranges with associated minimum and maximum speed limits of the CVT output. To alter the machine speed within the range available for each virtual gear ratio, the virtual gear map 200 can chart the operator input signal, e.g., modulation of the throttle or first pedal as a percentage, along the Y-axis 204. As the first pedal is depressed in increasing degrees of modulation, the output speed of the CVT may increase by following the upward sloping lines associated with each virtual gear ratio (1)-(8).

Referring back to FIG. 3, to enable operator selection of a particular virtual gear ratio, the controller 190 may communicate with the virtual gear shifter 126 on the first joystick 120. Because of the overlap in the virtual gear ratios, the operator may "shift" or transition between virtual gear ratios such as virtual gear ratio (1) and virtual gear ratio (2) and, accordingly, increase or decrease the available output of the CVT. For operator convenience and familiarity, the available speed ranges for each of the virtual gear ratios may correspond to the speed ranges of conventional, gear-based transmissions so that the operator may "shift" between expected or understood performance characteristics. Additionally, virtual gear shifter 126 may work in cooperation with the F-R-N selector 124 to select a plurality of virtual gear ratios associated with a reverse direction of the machine. In further embodiments, different numbers of virtual gear ratios may be employed including fractions or increments of discrete virtual gear ratios.

To increase or decrease the speed within the selected virtual gear ratio, the controller 190 can adjust the operating characteristics of the CVT 110, the power source 106, or a combination of the CVT and power source. For example, in some embodiments, the power source 106 may be held at a fixed and consistent speed and torque output and all adjustments to machine performance such as machine speed and torque can be accomplished in the CVT 110. As described above, this may be accomplished by selectively adjusting operation in the mechanical power-transfer path 160, hydrostatic power-transfer path 170 and/or the sun gear 180. Under certain performance conditions, regulating only the CVT 110 and fixing the power source 106 may result in improved fuel efficiencies.

Figure 5:
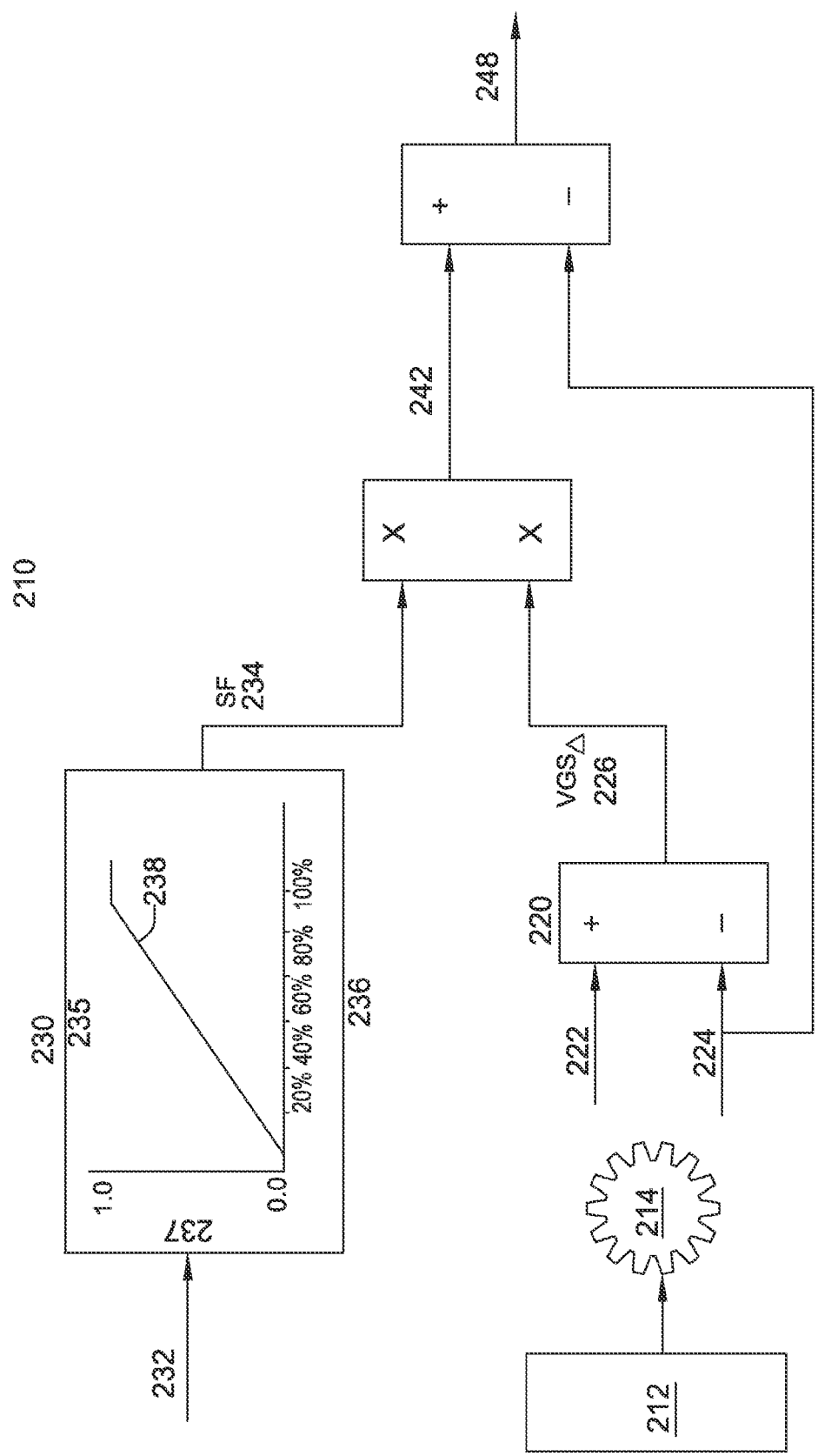
FIG. 5 is a schematic representation of a control strategy for generating a CVT speed command based in part upon the registered pedal modulation.

To regulate the output speed of the CVT 110 and thus the machine 100, the controller 190 can generate a CVT speed command and communicate it to the CVT. Referring to FIG. 5, there is illustrated an exemplary control strategy 210 that may be performed by the controller to generate and send the CVT speed command. The control strategy 210 can be composed of any suitable type of software routines, functions, modules, objects, classes, data structures, methods, records, libraries, etc., or any of the same implemented in hardware, collectively referred to herein as routines. In an initial gear selection routine 212, the control strategy 210 can record or determine the selected virtual gear ratio 214 that the operator has selected from among the available virtual gear ratios (1)-(8), for example virtual gear ratio (2). By determining the selected virtual gear ratio 214, the information and data processed by the control strategy 210 may specific to the speeds and output requirement specific to the selected virtual gear ratio.

To constrain the machine speed within the limits established by the selected virtual gear ratio 214, the control strategy 210 can access and retrieve the speed range and speed limit information for the selected virtual gear ratio from a control map such as the virtual gear map 200 through a retrieval routine 220. The retrieval routine 220 can extract the minimum virtual gear speed 222 and maximum virtual gear speed 224 associated with the selected virtual gear ratio (e.g., 4 kph and 12 kph for virtual gear ratio (2)) and applies them as limitations on machine operation. The retrieval routine 220 may generate a virtual gear speed delta ($VGS_A$) 226 by subtracting the minimum virtual gear speed 222 from the maximum virtual gear speed 224 so that the virtual gear speed delta represents the available speed range for the selected virtual gear ratio 214 as an absolute number. The control strategy 210 may communicate or pass $VGS_A$ 226 and, in some embodiments, the minimum virtual gear speed 222, on for further processing.

To account for operator adjustment of the machine speed within the limits set by the selected virtual gear ratio 214, the control strategy 210 may include a scaling routine 230 that can receive an operator input signal 232, for example, an electronic signal representing operator modulation of the right first pedal indicative of the operator's requested machine speed. The scaling routine 230 can convert the operator input signal 232 into a scaled factor (SF) 234 ranging between 0 and 1. For instance, the scaling routine 230 will convert an operator input signal 232 indicating that the operator has depressed the first pedal 50% to a SF 234 of 0.5. To accomplish this, the scaling routine 230 may include a scaling table 235 that registers the magnitude of the operator input signal 232 (e.g., pedal modulation as a percentage) on the X-axis 236 and the range of possible scale factors from 0.0 to 1.0 along the Y-axis 237. A reference curve or reference line 238 may be plotted in the scaling table 235 to enable conversion by cross-referencing the operator input signal 232 to the reference line 238. One possible advantage of using the scaling routing 230 to generate a SF 234 is that the operator input signal 232 may be normalized for use in other functions or routines processed by the controller.

The scaling routine 230 can pass SF 234 onto a multiplier routine 240 that also receives the $VGS_A$ 226 and combines those values by multiplication to arrive at a scaled requested speed 242, for example, according to the following equation:

$$VGS_A \times SF = \text{Scaled Requested Speed} \qquad (1)$$

Thus, the scaled requested speed 242 represents the speed range available for the selected virtual gear ratio that the operator is requesting. For example, if SF is 0.5 and the requested virtual gear ratio (2) has a minimum and maximum virtual gear speeds of 4 kph and 12 kph so that the $VGS_A$ is 8 kph (12 kph-4 kph), the scaled requested speed is 4 kph. Because of the minimum and maximum virtual gear speed limits that may apply to the selected virtual gear ratio, though, the scaled requested speed 242 may accurately reflect the speed characteristics of the selected virtual gear ratio. Accordingly, the scaled speed request 242 and the minimum virtual gear speed 222 are passed onto an addition routine 246 that adds the two values to calculate the machine speed requested by the operator (e.g., 4 kph+4 kph=8 kph). The control strategy 210 may communicate the requested machine speed as a CVT speed command 248 to the CVT to produce the desired machine speed.

Referring back to FIG. 3, the CVT 110 operating in response to the CVT speed command may be capable of generating the requested machine speed for the full range of speeds available under the plurality of virtual gear ratios. Accordingly, all adjustments to the output speed of the machine 100 may be made through the CVT 110 while the power source 106 is run at a fixed speed. However, such arrangements may result in a perceived lack of from the power source 106. For example, when an operator depresses the first pedal 130 to accelerate the machine, the operator may expect an audible response of the engine "revving up" or a tactile response of increased vibrations generated from the engine. Exclusively modifying the power output of the powertrain 108 through the CVT 110 fails to generate such responses. Accordingly, in an embodiment, the controller 190 may independently and simultaneously adjust the output of the power source 106.

Figure 6:
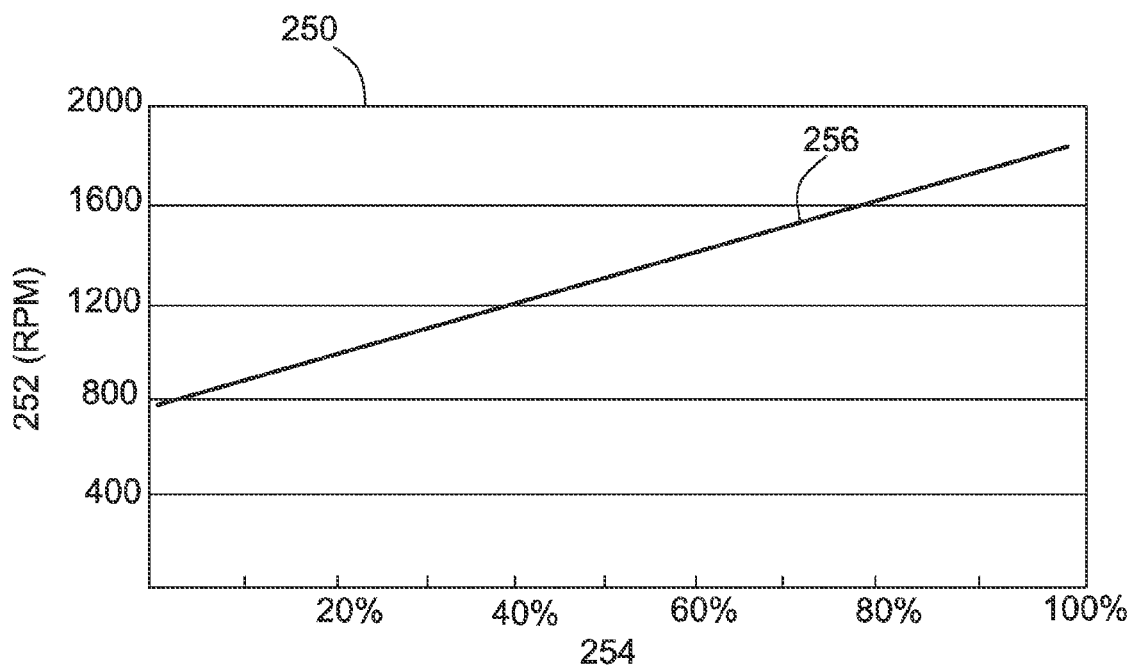
FIG. 6 is an illustration of another embodiment of a control map or chart correlating power source speed to registered pedal modulation.

Referring to FIG. 6, to assist in regulating the power source, the controller may include a power source speed map 250 representing the range of available speeds the power source can produce. As mentioned above, a diesel burning internal combustion engine may, for example, produce speeds between a minimum power source speed or "low idle" of about 800 RPM and a maximum power source speed or "high idle" of about 1850 RPM, which the power source speed map may chart along the Y axis 252. To correlate the power source speed with the operator input signal 232 generated by articulation of the first pedal, the map 250 may chart the magnitude of the operator input signal on the X-axis 254. Reference between the two may be accomplished by plotting a response curve 256 that may be determined empirically by measuring pedal-to-engine responses in existing machine. Although in the illustrated embodiment, the response curve is linear, in other embodiments the response curve may have different shapes.

Figure 7:
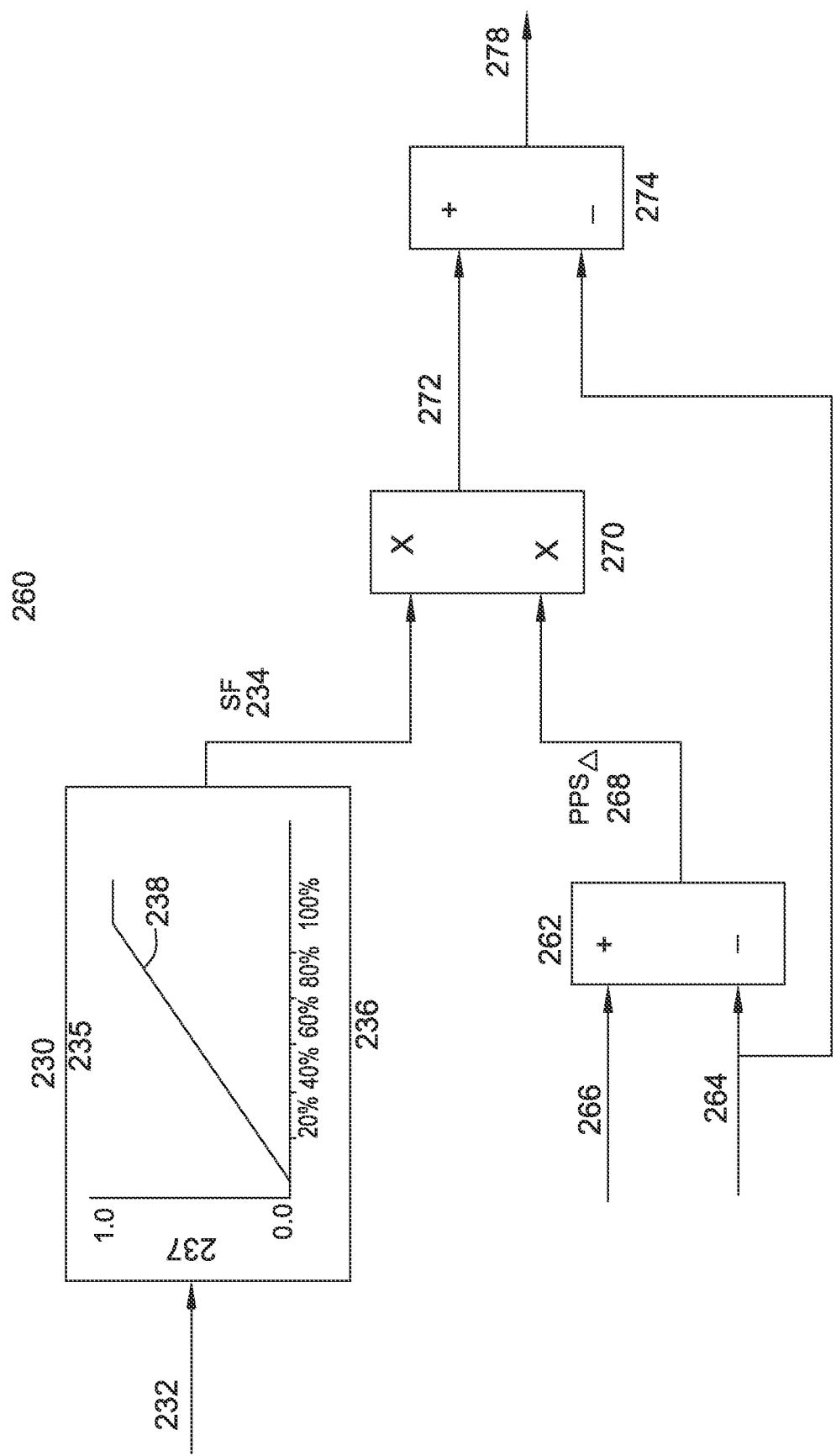
FIG. 7 is a schematic representation of a control strategy for generating a power source speed command based in part upon registered pedal modulation.

In addition to or instead of the power source speed map 250, the controller can perform a second control strategy 260, such as that indicated in FIG. 7, to generate a power source speed command for regulating the power source. To constrain the power source output speed within the physical limits of the engine, the control strategy 260 can include a retrieval routine 262 that retrieves the minimum power source speed 264 and the maximum power source speed 266 from, for example, the power source speed map. The minimum and maximum power source speeds may be independent of the selected virtual gear ratio. The retrieval routine 262 can also generate a power source speed delta ($PSS_A$) 268 by subtracting the minimum and the maximum power source speeds. For the exemplary diesel engine, the $PSS_A$ may be calculated as 1850 RPM-800 RPM=1250 RPM. The $PSS_A$ and the minimum power source speed 264 can be passed on for further processing.

To account for the operator input signal 232, the second control strategy may utilize a scaling routing similar to, and in some embodiments the same as, the scaling routine 230 utilized by the first control strategy. The scaling routine 230 produce a SF 234 between 0.0 and 1.0, reflecting the degree of operator modulation of the first pedal, e.g., 0.5. The SF 234 and $PSS_A$ are passed to a multiplication routine 270 that multiples the two values to calculate a scaled requested RPM 272 representing the desired power source speed according the following equation:

$$PSS_A \times SF = \text{Scaled Requested RPM} \quad (2)$$

In the ongoing example, the scaled requested RPM 272 may be calculated as 1250×0.5=625. Because the scaled requested RPM 272 does not directly correlate to the true range of power source speeds and, in fact, may be below the stall speed, the scaled requested RPM may be recombined with the minimum power source speed 264 in an addition routine 274. The result of the addition routine 274 is a power source speed command 278, e.g., 625 RPM+800 RPM=1425 RPM. The controller communicates the power source speed command 278 to the power source to regulate its output speed in accordance with the operator request. As will be familiar to those of skill in the art, in those embodiments utilizing a diesel-burning internal combustion engine, the output speed may be adjusted by increasing or decreasing the fuel quantity introduced and combusted in the combustion chambers. In some further embodiments, the power source speed command may be further adjusted for fuel economy, throttle lock, situational rate limiting strategies, performance improvement features, etc.

The result of the second control strategy can generate a response from the power source that may meet the sensory expectations of operators controlling the machines. In some embodiments, the additional output of the power source 106 in the form of increased torque or speed may be accounted for in the CVT 110 by, for example, dissipating the torque or speed changes in the hydrostatic power-transfer path 170 or the mechanical power-transfer path 160. In other embodiments, the change in output from the power source 106 may be offset by a clutch disposed in the powertrain 108. If the rotary output of the power sources 106 increases, the clutch can be partially released resulting in slippage within the powertrain 108 so that the RPM of the propulsion devices 104 remains consistent. In this manner, adjustments to the output speed of the power source can be made without substantially affecting the speed of the machine that may be directly related to the output speed of the CVT.

INDUSTRIAL APPLICABILITY

Figure 8:
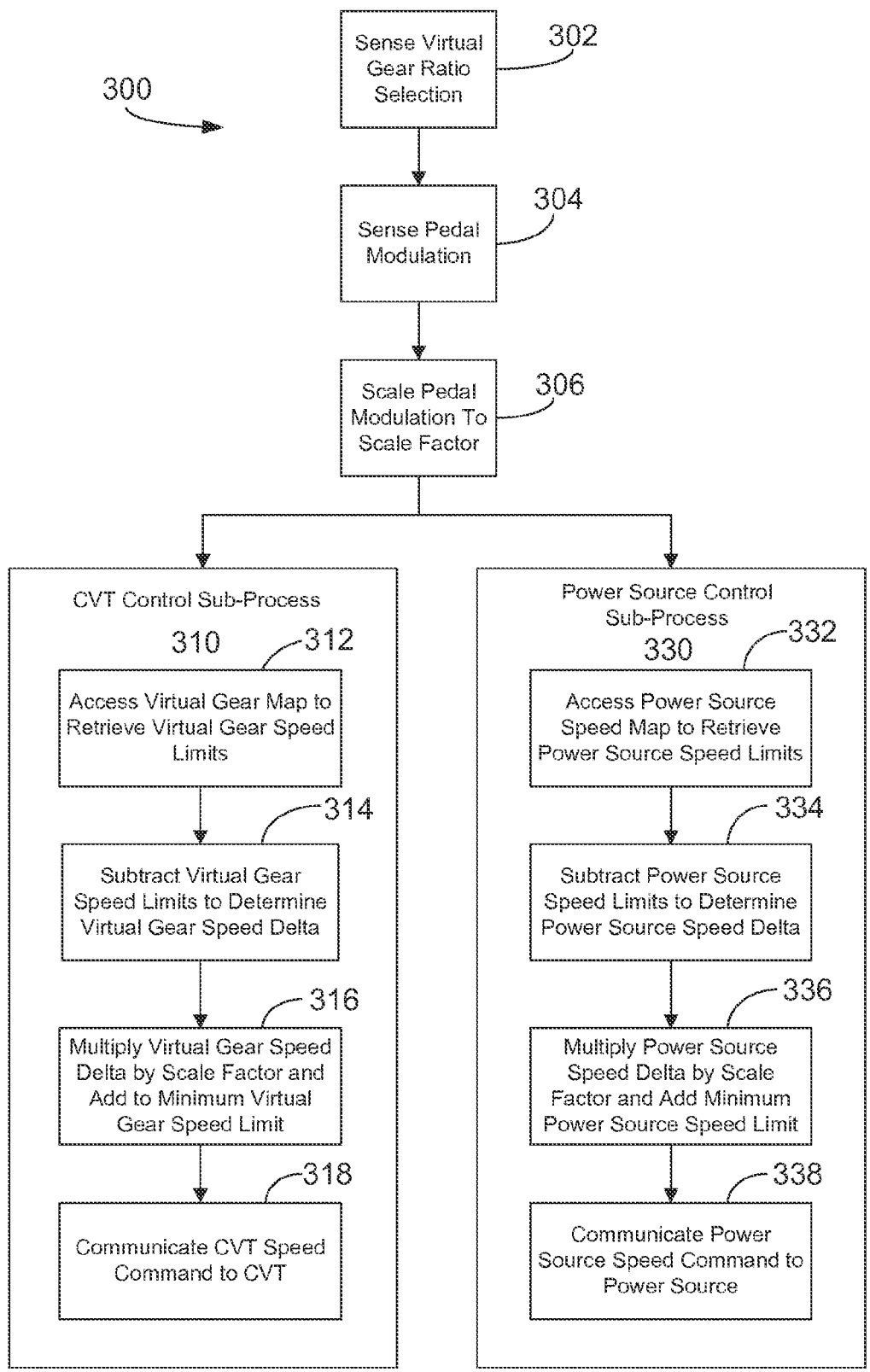
FIG. 8 is a flowchart illustrating a possible routine or process for operating a machine by simultaneously adjusting a CVT and a power source.

In accordance with an aspect of the disclosure, an operator of a machine can initiate simultaneous, independent responses both in a power system coupled to a CVT and in the CVT by modulating an operator input device such as a pedal. Referring to FIG. 8, there is illustrated an example of a flowchart 300 embodying a process for controlling operation of the power source and of the CVT. In a virtual gear determination step 302, the process may determine which virtual gear ratio the operator has selected among the plurality of available virtual gear ratios for operating the machine. In a pedal modulation determination step 304, the process can measure the operator input signal, such as modulation of a pedal located in the operator station. The operator input signal may indicate a desired adjustment to the ground speed of the machine, such as by acceleration or deceleration of the machine. Because of the minimum speed limitations that may apply to both the power source and the selected virtual gear ratio, the operator input signal may not be readily convertible to directly control operation of the powertrain in an accurate manner. Therefore, the process may include a scaling step 306 in which the operator input signal is converted to an intermediate scaled factor of between 0.0 and 1.0. The scale factor may be used with the control strategies depicted in FIGS. 5 and 7 to determine the requested machine speed.

Utilizing the intermediate scaled factor, the process can independently control the operation of the CVT and power source by simultaneously performing two separate control routines or processes including a CVT control sub-process 310, and a power source control sub-process 330. To convert the scale factor to a CVT speed command, the CVT control sub-process 310 can determine the minimum virtual gear speed and maximum virtual gear speed that applies for the selected virtual gear ratio in a virtual gear speed limit determination step 312. The minimum and maximum virtual gear speed limits for each available virtual gear ratio may be included with a map, chart, table or the like stored in the controller. Once the minimum and maximum virtual gear speed limits are determined, they can be subtracted from each other in a subtraction step 314 to determine a virtual gear speed delta. The CVT control sub-process 310 includes an arithmetic step 316 that multiplies the virtual gear speed delta by the scale factor and adds the result to the minimum virtual speed limit to determine a CVT speed command. In a communication step 318, the CVT control sub-process 310 communicates the CVT speed command to the CVT to cause adjustment of the rotary output of the CVT in accordance with the requested ground speed change.

To adjust the operation of the power source in a manner that the operator may expect, the power source control sub-process 330 first determines the minimum and maximum power source speed limits in a power source speed determination step 332. In a subtraction step 334, the power source control sub-process 330 subtracts the minimum and maximum speed limits to determine a power source speed delta. In an arithmetic step 336, the power source speed delta is multiplied by the scale factor and the result is added to the minimum power source speed limit to determine a power source speed command. In another communication step 338, the power source control sub-process 330 communicates the power source speed command to the power source to initiate adjustment in its operation. The power source thereby performs in a manner the operators may expect, such as by providing a sensation of the power source "revving" up when the operator commands that machine accelerate.

In the present embodiment, the power source speed command is generated independently of the selected virtual gear ratio so that the full range of power source speed between minimum and maximum may apply to the full range of virtual gear speeds for each of the plurality of virtual gear ratios. Moreover, because the CVT control sub-process and the power source control sub-process may utilize the same operator input signal and, in some embodiments, the same scale factor to independently adjust the CVT and the power source, a sense of proportionality or correlation in the increasing speed of the two components may be provided. For example, as the CVT may increase the output speed of the machine, the operator may notice a proportional or correlated increase in the output speed of the power source in accordance with the conventional response expected of machines using gear-based transmission. Another possible advantage of the disclosure is that, by independent controlling the power source and the CVT, the minimum and maximum speed limitations associated with the power source and the CVT may be separately accounted for. For example, the control strategy for the power source can function to constrain its operation within the physical limits of the power source. The control strategy for the CVT, however, may account for separate speed limitations that can apply to each of plurality of virtual gears ratios available. A single control strategy for the power source may be used with each of the plurality of virtual gear ratio.

Controlling the CVT and power source independently of each other may also assist the operator in determining when to shift virtual gears. For example, the operator may fully depress the pedal indicating an intention for full acceleration. However, the CVT may approach or have reached the maximum virtual gear speed for the selected virtual gear. Because the CVT may not provide a sufficient audible or vibratory response, the operator may not be aware that the CVT has approached its maximum limits. Because of the correlation between the CVT speed increase and the power source increase such that the power source may also be approaching its maximum power source speed, the operator might determine from the power source that the machine is approaching the limitations for the selected virtual gear. The operator may make this determination directly, for instance, by referring to a tachometer displaying the output RPM of the power source, or indirectly by the tactile sensations or possibly the audible sound the power source produces. The operator may therefore decide to shift the virtual gears to continue acceleration of the machine.

In some embodiments, the operator may have the option of selecting whether to implement the control strategy to adjust operation of only the CVT while maintaining the output of the power source at a fixed rate or adjusting both the CVT and power source. Therefore, different operators who may be assigned to the same machine may modify the control strategy to operate the machine according to their preferences. In some embodiments, the disclosed control strategy may be utilized with further control strategies.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method of controlling a machine speed of a machine including a continuous variable transmission (CVT) operatively coupled to a power source, the method comprising:
   selecting a virtual gear ratio from a plurality of virtual gear ratios;
   receiving an operator input signal indicative of a desired adjustment in the machine speed;
   converting the operator input signal to a CVT speed command associated with the virtual gear ratio selected and communicating the CVT speed command to the CVT;
   adjusting the machine speed by operating the CVT in accordance with the CVT speed command;
   converting the operator input signal to a power source speed command and communicating the power source speed command to the power source; and
   adjusting a speed of the power source in accordance with the power source speed command substantially independently of the CVT speed command.

2. The method of claim 1, wherein the step of converting the operator input signal to a power source speed command includes comparing the operator input signal to a power source speed map including a minimum power source speed and a maximum power source speed, the minimum power source speed and the maximum power source speed mapped independently of machine speed.

3. The method of claim 2, wherein each virtual gear ratio of the plurality of virtual gear ratios has a range of virtual gear speeds between a minimum virtual gear speed and a maximum virtual gear speed.

4. The method of claim 3, wherein the speed of the power source is adjusted proportionally to the range of virtual gear speeds for each virtual gear ratio.

5. The method of claim 1, wherein the CVT speed command is determined independently of the power source speed command.

6. The method of claim 5, wherein each virtual gear ratio is associated with a virtual gear ratio map, and the virtual gear ratio map including the minimum virtual gear speed and the maximum virtual gear speed for the virtual gear ratio selected.

7. The method of claim 6, further including converting the operator input signal to a scaling factor; comparing the scaling factor to a power source speed map to determine the speed of the power source; and comparing the scaling factor to the virtual gear ratio map for the virtual gear ratio selected to determine the machine speed.

8. The method of claim 7, wherein the step of adjusting the machine speed by operating the CVT in accordance with the CVT speed command is accompanied by a generally inverse adjustment to a CVT torque output.

9. The method of claim 1, further comprising dissipating at least a portion of a power source output from the power source in the CVT.

10. The method of claim 1, wherein the CVT is operatively coupled to a propulsion device.

11. A machine having a continuously variable transmission (CVT) operatively coupled to a power source; the machine comprising
    a CVT having a plurality of selectable virtual gear ratios, each virtual gear ratio having a range of virtual gear speeds between a minimum virtual gear speed and a maximum virtual gear speed;
    a power source having a range of power source speeds between and minimum power source speed and a maximum power source speed;
    an operator input device communicating with the CVT to adjust the virtual gear speed between the minimum virtual gear speed and the maximum virtual gear speed for the virtual gear ratio selected; and
    the operator input device communicating with the power source to adjust the power source speed between the minimum power source speed and the maximum power source speed independent of the virtual gear ratio selected.

12. The machine of claim 11, wherein the operator input device is a pedal.

13. The machine of claim 11, wherein modulation of the operator input device adjusts the power source speed proportional to the virtual gear speed for each of the plurality of virtual gear ratios.

14. The machine of claim 11, wherein the step of adjusting the virtual gear speed is accompanied by a generally inverse adjustment to a CVT torque output.

15. The machine of claim 14, wherein the operator input device adjusts the power source speed by changing a quantity of fuel introduced to the power source.

16. The machine of claim 11, wherein the CVT is operatively coupled to a propulsion device.

17. The machine of claim 11, further comprising a controller including a plurality of maps with at least one power source speed map having the minimum power source speed and the maximum power source speed.

18. The machine of claim 17, wherein the plurality of maps further includes a virtual gear ratio map associated with each of the plurality of virtual gear ratios, each virtual gear ratio map having the minimum virtual gear speed and the maximum virtual gear speed for the virtual gear ratio associated with the virtual gear ratio map.

19. A method of adjusting speed of a machine having a power source operatively coupled to continuously variable transmission (CVT) comprising:
    receiving an operator input signal indicative of a desired machine speed;
    converting the operator input signal to a scaling factor;
    comparing the scaling factor with a range of power source speeds including a minimum power source speed and a maximum power source speed to determine a power source speed command and communicating the power source speed command to the power source;
    operating the power source in accordance with the power source speed command;
    selecting a virtual gear ratio from a plurality of virtual gear ratios associated with the CVT, each virtual gear ratio including a range of virtual gear speeds between a minimum virtual gear speed and a maximum virtual gear speed;
    comparing the scaling factor to the range of virtual gear speeds for the virtual gear ratio selected to determine a CVT speed command and communicating the CVT speed command to the CVT; and
    operating the CVT in accordance with the CVT speed command.

20. The method of claim 19, wherein the scaling factor maintains proportionality between power source speed command and the CVT speed command.

* * * * *